(12) United States Patent
Singh

(10) Patent No.: US 11,875,323 B2
(45) Date of Patent: Jan. 16, 2024

(54) AUTOMATED TELLER MACHINE (ATM) TRANSACTION PROCESSING LEVERAGING SMART CONTACT LENSES

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 262 days.

(21) Appl. No.: 17/493,974

(22) Filed: Oct. 5, 2021

(65) Prior Publication Data
US 2023/0106334 A1    Apr. 6, 2023

(51) Int. Cl.
| | |
|---|---|
| G06Q 20/10 | (2012.01) |
| H04W 4/80 | (2018.01) |
| G06Q 20/40 | (2012.01) |
| G06V 40/19 | (2022.01) |
| G06Q 20/20 | (2012.01) |
| G06Q 20/32 | (2012.01) |
| G06F 3/0482 | (2013.01) |
| G06F 3/01 | (2006.01) |

(52) U.S. Cl.
CPC ......... *G06Q 20/1085* (2013.01); *G06F 3/011* (2013.01); *G06F 3/013* (2013.01); *G06F 3/017* (2013.01); *G06F 3/0482* (2013.01); *G06Q 20/20* (2013.01); *G06Q 20/321* (2020.05); *G06Q 20/40145* (2013.01); *G06V 40/19* (2022.01); *H04W 4/80* (2018.02)

(58) Field of Classification Search
None
See application file for complete search history.

(56) References Cited

U.S. PATENT DOCUMENTS

| | | | |
|---|---|---|---|
| 5,351,339 A | 10/1994 | Reuber et al. | |
| 9,503,146 B1 | 11/2016 | Chen | |
| 10,101,599 B1 | 10/2018 | Greeson | |
| 10,247,947 B2 | 4/2019 | Van Heugten | |

(Continued)

OTHER PUBLICATIONS

Yadron, D. (2016). Samsung patent reveals 'smart' contact lens with built-in camera. (Year: 2016).*

(Continued)

*Primary Examiner* — Kito R Robinson
(74) *Attorney, Agent, or Firm* — Weiss & Arons LLP

(57) ABSTRACT

Methods for performing a touchless transaction at a communication terminal leveraging a smart contact lens is provided. Methods may include initiating a pairing of the smart contact lens to the communication terminal and in response to the pairing displaying on a graphical user interface ("GUI") of the communication terminal, a plurality of selectable option buttons. Methods may further include tracking a focus of the user's eyes on the GUI. When a first deliberate eye blink gesture is identified while the user's eye is focusing on the GUI, methods may include determining a point of focus of the user's eye and identifying a selectable option button that is located within a pre-determined range of the point of focus. Methods may further include determining a transaction type corresponding to the selected option button and transmitting an instruction to the communication terminal to initiate a transaction corresponding to the transaction type.

16 Claims, 4 Drawing Sheets

(56) References Cited

U.S. PATENT DOCUMENTS

| | | |
|---|---|---|
| 10,288,902 B2 | 5/2019 | Liao |
| 10,330,957 B2 | 6/2019 | Boss et al. |
| 10,353,463 B2 | 7/2019 | Shtukater |
| 10,359,648 B2 | 7/2019 | Kim et al. |
| 10,399,291 B2 | 9/2019 | Hahn et al. |
| 10,588,217 B2 | 3/2020 | Sun et al. |
| 10,656,438 B2 | 5/2020 | Liao |
| 10,678,071 B2 | 6/2020 | Boss et al. |
| 10,705,352 B2 | 7/2020 | Greeson |
| 10,732,416 B2 | 8/2020 | Van Heugten |
| 10,754,178 B2 | 8/2020 | Kim et al. |
| 10,823,979 B2 | 11/2020 | Liao |
| 10,834,589 B2 * | 11/2020 | Bharti ............... G02C 7/04 |
| 10,845,620 B2 | 11/2020 | Shtukater |
| 10,899,014 B2 | 1/2021 | Du et al. |
| 10,901,505 B1 | 1/2021 | Haine et al. |
| 10,942,369 B2 | 3/2021 | Pinel et al. |
| 10,963,045 B2 | 3/2021 | Weldmariam et al. |
| 2014/0353501 A1 | 12/2014 | Fantone et al. |
| 2015/0362757 A1 | 12/2015 | Fu |
| 2016/0091737 A1 | 3/2016 | Kim et al. |
| 2016/0299354 A1 | 10/2016 | Shtukater |
| 2016/0324451 A1 | 11/2016 | Young |
| 2017/0023793 A1 | 1/2017 | Shtukater |
| 2017/0061405 A1 * | 3/2017 | Bryant ............ G06Q 20/4014 |
| 2017/0083909 A1 * | 3/2017 | Mork ............... G06Q 20/385 |
| 2017/0270636 A1 | 9/2017 | Shtukater |
| 2017/0371184 A1 | 12/2017 | Shtukater |
| 2018/0210235 A1 | 7/2018 | Boss et al. |
| 2018/0224669 A1 | 8/2018 | Shtukater |
| 2018/0361588 A1 | 12/2018 | Du et al. |
| 2019/0025607 A1 | 1/2019 | Liao |
| 2019/0025608 A1 | 1/2019 | Liao |
| 2019/0025609 A1 | 1/2019 | Liao |
| 2019/0033618 A1 | 1/2019 | Choi et al. |
| 2019/0094570 A1 | 3/2019 | Jow et al. |
| 2019/0179165 A1 | 6/2019 | Shtukater |
| 2019/0204625 A1 | 7/2019 | Greeson |
| 2019/0227348 A1 | 7/2019 | Boss et al. |
| 2019/0250432 A1 | 8/2019 | Kim et al. |
| 2019/0282094 A1 | 9/2019 | Lamrani et al. |
| 2019/0293964 A1 | 9/2019 | Takaki et al. |
| 2019/0332168 A1 | 10/2019 | Weldemariam et al. |
| 2020/0022256 A1 | 1/2020 | Sun et al. |
| 2020/0026097 A1 | 1/2020 | Pinel et al. |
| 2020/0116897 A1 | 4/2020 | Schadlu et al. |
| 2020/0138702 A1 | 5/2020 | Kim et al. |
| 2020/0162698 A1 | 5/2020 | Rakshit et al. |
| 2020/0201074 A1 | 6/2020 | Kim et al. |
| 2020/0319479 A1 | 10/2020 | Hahn et al. |
| 2020/0333637 A1 | 10/2020 | Greeson |
| 2020/0400957 A1 | 12/2020 | Van Heugten |
| 2021/0007643 A1 | 1/2021 | Lamrani et al. |
| 2021/0081952 A1 | 3/2021 | Rakshit |
| 2021/0081953 A1 | 3/2021 | Rakshit |
| 2021/0124415 A1 | 4/2021 | Haine et al. |
| 2021/0232177 A1 * | 7/2021 | Adari ............... G06Q 20/321 |

OTHER PUBLICATIONS

"Eye Tracking," https://en.wikipedia.org/wiki/Eye_tracking, Wikimedia Foundation, Inc., Jun. 8, 2021.

"LiFi—What It Is, How It Works, What It Provides, How to Apply, and Its Future Prospects," https://www.led-professional.com/resources-1/articles/lifi-what-it-is-how-it-works-what-it-provides-how-to-apply-and-its-future-prospects, LED Professional, Jan. 15, 2018.

Hiren, "Global Smart Contact Lenses Market: Industry Analysis and Forecast (2021-2027)—by Type, Application and Region," https://ksusentinel.com/2021/04/14/global-smart-contact-lenses-market-industry-analysis-and-forecast-2021-2027-by-type-application-and-region/, Apr. 14, 2021.

"This Is Eye Tracking," https://www.tobii.com/group/about/this-is-eye-tracking/, Tobii AB, Retrieved on Jun. 29, 2021.

"LiFi," https://en.wikipedia.org/wiki/Li-fi, Wikimedia Foundation, Inc., Jun. 25, 2021.

"Sony's Smart Contact Lens Will Blow Your Mind Away!" https://medium.com/chip-monks/sonys-smart-contact-lens-will-blow-your-mind-away-308f3d6da687, Chip-Monks, Jul. 5, 2017.

* cited by examiner

AUTOMATED TELLER MACHINE (ATM) TRANSACTION PROCESSING LEVERAGING SMART CONTACT LENSES

FIELD OF TECHNOLOGY

Aspects of the disclosure relate to providing systems and methods for use with smart contact lenses. In particular, the disclosure relates to systems and methods for using smart contact lenses for communicating with a communication terminal.

BACKGROUND OF THE DISCLOSURE

An automated teller machine ("ATM") is a device that many people come in contact with daily. The ATM requires physical touch to the device and/or screen in order to communicate and perform transactions.

Users of the ATM may prefer not to have to come in physical contact with the ATM.

Additionally, a user may have a physical disability that may make it difficult or in some circumstances impossible, to access the ATM.

Smart contact lenses may be defined as wearable contact lenses that include both hardware and software components. Smart contact lenses may adopt the structure of a conventional pair of contact lenses. Smart contact lenses may also include a microprocessor embedded in the smart contact lens that may provide processing capabilities.

It would be desirable to leverage smart contact lens capabilities to enable a touchless communication/experience at the ATM.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
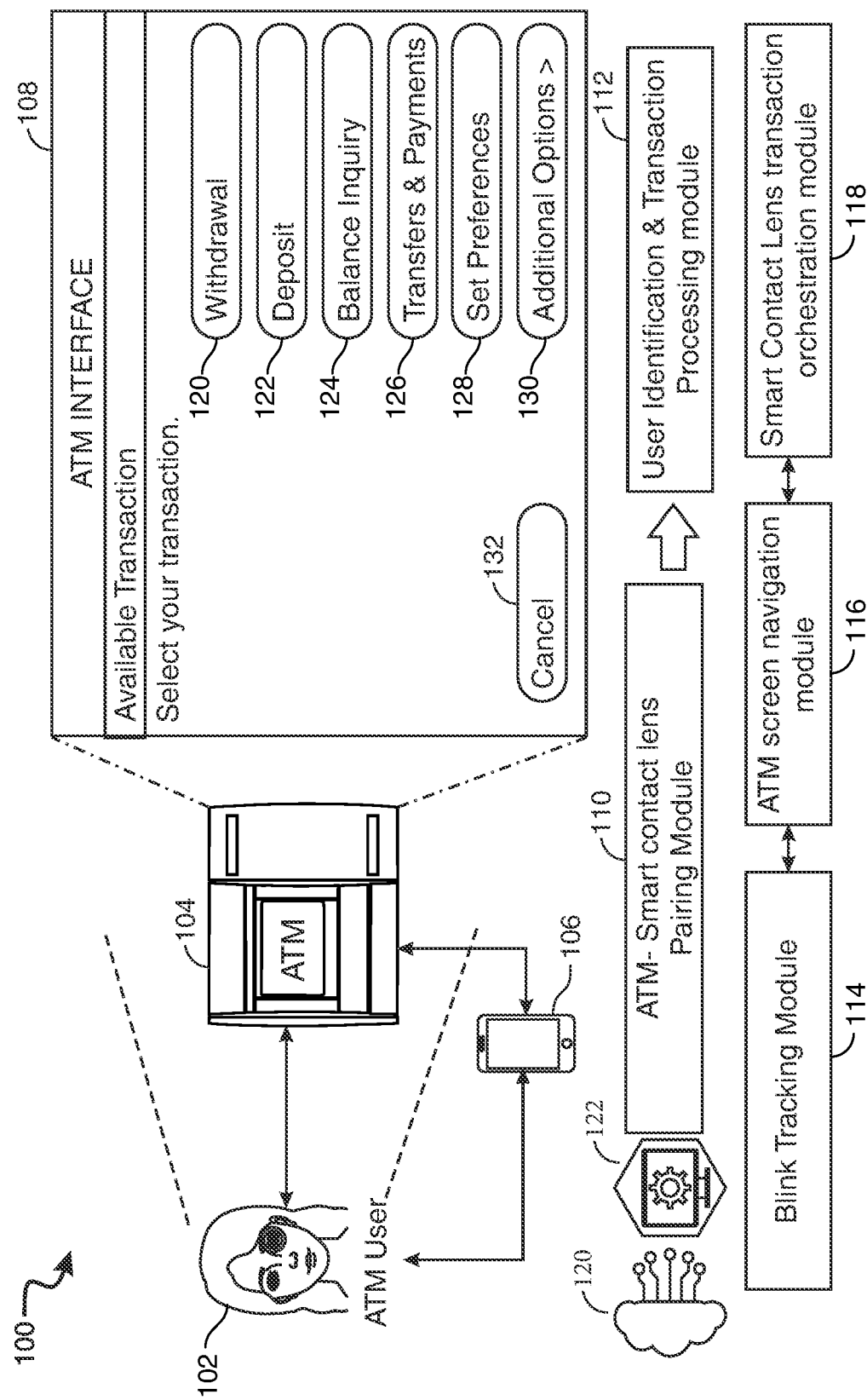
FIG. 1 shows an illustrative system in accordance with principles of the disclosure.

A method for performing a touchless transaction at a communication terminal is provided. The performing may leverage a smart contact lens. The smart contact lens may be positioned on an eye of a user. The user may be within a pre-determined proximity to the communication terminal.

A communication terminal for the purposes of the disclosure may include in some embodiments, an automated teller machine ("ATM"). The communication terminal may include a point of sale ("POS") device and/or any other suitable computing device that may be configured for performing transactions and interacting with a user(s).

The pre-determined proximity to the communication terminal may be a proximity enabling a wireless communication between the smart contact lens and the communication terminal.

The smart contact lens may be configured for location on a user's eye. For the purposes of this disclosure, a smart contact lens, may be understood to refer to wearable contact lenses. A smart contact lens may be made from materials used for wearable contact lenses such as soft and pliable hydrophilic plastic.

In some embodiments, the smart contact lens may be a first smart contact lens on a first eye. The system may also include a second smart contact lens on a second eye. The two smart contact lenses may be a pair of smart contact lenses.

A smart contact lens may include one or more internal processors. The one or more internal processors may include one or more microprocessors.

In addition to the processors, the smart contact lens may also include hardware components associated with conventional contact lenses.

The smart contact lens may include a micro camera. The micro camera may be operable to capture data from a first graphical user interface ("GUI") and from a second GUI and from any additional GUI that may be included in the system.

The smart contact lens may include a memory unit. The memory unit may be for storing the data captured from the first GUI and from the second GUI.

The smart contact lens may include one or more sensors. The sensors may be configured to capture a user's point of focus. Sensors may include the camera. Sensors may also include piezoelectric sensors, infrared sensor and/or an acceleration sensor. These micro electronic sensors may be configured to measure changes in pressure, temperature, acceleration and force. The smart contact lens may be configured to use the measurement and translate them into control instructions.

In some embodiments, the smart contact lens may include near-field communication ("NFC") capabilities. The smart contact lens may be a near-field communication ("NFC") powered device. The communication terminal may be an NFC powered terminal.

The distance that may enable a communication between the smart contact lens and the communication terminal may be within the NFC enabled communication ranges. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

The smart contact lens may include an antenna. The antenna may be a loop antenna. The antenna may be configured to enable radio frequency communication. The antenna may extend the range of NFC to 20 centimeters.

In some embodiments, the smart contact lens may include light fidelity ("Lifi") capabilities. The communication between the smart contact lens and the communication terminal may be enabled via Lifi.

The smart contact lens may include a light emitting diode ("LED"). The LED may be attached to a substrate on the smart contact lens. The LED may be connected to a microcontroller and/or a microprocessor. The LED may be operable to transmit data captured to the communication terminal. The LED may be operable to transmit data to any one or more additional computing devices.

Lifi is a two-way network protocol for high speed connectivity using light technology. LiFi is a light-based communication system capable of transmitting data wirelessly at high speed using light emitting diodes (LEDs). The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human eye. The data may be decoded by an optical sensor on the receiving end and converted back into an electronic data stream.

In some embodiments, LED bulbs may be dimmed to levels below human visibility while still emitting enough light to carry data. The transmission speed of LiFi may enable transfers at a very fast speed.

LiFi may use the visible light spectrum which is very large and is therefore not limited by spectrum capacity.

LiFi is able to deliver consistent large data transfers. Additionally, LiFi frequencies may be used in electromagnetic sensitive areas without causing interference. LiFi infrastructure may be relatively simple and may not require the use of radio transmitters and antennaes.

The limited hardware required for LiFi communications may also improve energy efficiency.

The smart contact lens may be exposed to light, mechanical movement of blinking and electromagnetic conduction and may harvest energy from these sources.

The microprocessor embedded in the smart contact lens may be operable to capture, store and transmit data to the communication terminal.

One or more software modules may execute on the processors. The one or more software modules may be stored in a memory located within the smart contact lens. The one or more software modules may, in the alternative, be referred to as applications. The applications may enable the smart contact lens to execute various tasks.

The microprocessor may execute an eye movement tracking application. The eye movement tracking application may execute an eye tracker application. Sensors may be controlled by the eye tracking application executed on the smart contact lenses microprocessor. Eye position data detected by the sensors may be collected by the eye tracking application. Eye position data detected by the sensors may be stored in a memory embedded in the smart contact lenses. Sensors for tracking user eye position may include cameras. In some embodiments, the cameras may be combined with illuminators. The illuminators may include a near infrared light source or any suitable light source.

One method of tracking user eye position involves pupil center corneal reflection (PCCR). PCCR is a method for remote, non-intrusive eye tracking. A light source illuminates the eye causing visible reflections and a camera captures an image of the reflections. A vector is calculated based on the angle between the cornea and pupil reflections. The direction of the vector combined with other geometrical features of the reflections may be used to determine eye position. Eye position may include gaze direction.

In some embodiments, the smart contact lenses may include multiple cameras per eye for increased accuracy in measuring gaze direction. The smart contact lens may include accelerometer, gyroscope and magnetometer sensors in order to provide differentiation between head and eye movements. The smart contact lens may include slippage compensation and persistent calibration to enable integrating the smart contact lenses with the development platform and may enable a user to develop applications in a hands-free manner.

The method for performing the touchless transaction may include pairing the smart contact lens to the communication terminal. The pairing may include confirming the user of the smart contact lens as an authenticated user of the communication terminal.

In some embodiments, the pairing may include a multi-factor authentication of the user. The pairing may be enabled via the communication terminal. The pairing may be enabled when the smart contact lens is within the pre-determined proximity to the communication terminal.

The pairing may include, receiving a token at the smart contact lens from the communication terminal. The token may be a password. The pairing may include displaying the token on a virtual screen on the smart contact lens. Following the displaying, the pairing may include inputting the token into a mobile application on a mobile device of the user. It should be appreciated that the mobile device may also be within the pre-determined proximity to the communication terminal in order to receive the token.

In response to the inputting of the token into the mobile application, the pairing may include transmitting the token from the mobile application to the communication terminal. The pairing may further include confirming, at the communication terminal, the smart contact lens, mobile device and token being associated with a user-profile of the user of the smart contact lens.

In some embodiments the pairing may include identifying, by the communication terminal, a device identification associated with the smart contact lens. The device identification may be an identification number. The pairing may also include performing, by the communication terminal, an iris recognition scan on an iris of the user to determine iris properties of the user. The pairing may further include confirming the device identification and the iris properties correspond to device identification and iris properties stored in the user-profile associated with the user at the communication terminal.

Because the pairing may authenticate the user and enable the user to perform one or more transactions with the communication terminal, the user may not need to insert any form of a card for identification and authorization.

When either one or both of the devices identification and the iris properties do not correspond to the stored device identification and the stored iris properties, the method may include disabling the performing of the one or more transactions on the communication terminal. The disabling may include displaying an error message on the GUI. The disabling may further include disabling the selectable option buttons on the display from being selectable.

In response to the pairing, the method may include enabling a communication between the smart contact lens and the communication terminal by displaying on a GUI of the communication terminal, a plurality of selectable option buttons.

The method may further include triggering a tracking of a focus of the user's eyes on the GUI.

When a first deliberate eye blink gesture is identified while the user's eye is focusing on the GUI, the method may include determining a point of focus of the user's eye.

The deliberate eye blink gesture may be a blink of the eye that may be longer than an average blink of an eye. An average blink of an eye may be between 0.2 second and 0.4 seconds. When the blink of the eye is determined to be longer than the average blink, the method may include determining the blink to be a deliberate blink.

Following the determining of the point of focus, the method may include identifying a selectable option button that is located within a pre-determined range of the point of focus. The pre-determined range of focus may define a field of focus surrounding the point of focus. The selectable option button may be the selected option button.

The deliberate eye blink gesture may be a blink of the eye that may be longer than an average blink of an eye. An average blink of an eye may be between 0.2 second and 0.4 seconds. When the blink of the eye is determined to be longer than the average blink, the method may include determining that the blink is a deliberate blink.

It should be appreciated that the system may not be limited to a single and double eye blink gestures. In some embodiments, the length of each deliberate eye blink gesture may be indicative of a point of focus. In other embodiments, multiple deliberate eye blink gestures may be indicative of a point of focus.

The method may also include determining a transaction type corresponding to the selected option button. Each selectable option button on the GUI may correspond to a specific transaction type. Transactions may include but may not be limited to a payment, a check balance, a withdrawal, a deposit and a transfer.

In some embodiments, the determining of the transaction type may include capturing an image of the field of focus. Following the capturing, the determining may include comparing the image to a list of pre-stored images and corresponding transaction types stored in a database on the smart contact lens. Based on the comparing, identifying the transaction type corresponding to the image.

The method may also include confirming an accuracy of the selected option button. The confirming may include highlighting on the GUI the selected option button. In response to the highlighting, the method may include identifying a second deliberate eye blink gesture at the point of focus. In response to the detecting, the method may include confirming the accuracy of the selected option button.

In some embodiments, the confirming of the accuracy may include displaying a name of the transaction associated with the selected option button on an augmented reality display of the smart contact lenses. In response to the displaying, the user may confirm the transaction by performing one or more deliberate eye blink gestures to confirm or cancel the transaction.

The method may further include transmitting an instruction to the communication terminal. The instruction may include a request to initiate a transaction corresponding to the transaction type.

It should be appreciated that in some embodiments, the user may wish to override the point of focus at the time of the deliberate eye blink gesture. Systems and methods may recognize specific eye blink gestures that may infer a cancelling of a desired transaction or of a selectable option button that was selected. For example, the system may detect three deliberate eye blink gestures one after another. This may initiate a cancelling of the performing of a transaction and may enable the user to restart a performing of a single deliberate eye blink gesture. In another example, a prolonged single deliberate eye blink gesture may infer an override. The prolonged single deliberate eye blink gesture may include a closing of the eyelid for a length of time greater than the length of time for a deliberate eye blink.

Alternatively, the user may use a keystroke on a keypad of the ATM to invoke a cancellation. This may combine a contactless and direct contact communication with the ATM when desired.

In some embodiments, the GUI may be a first GUI. In response to a receipt of the communication, the method may further include executing an application programming interface ("API") call to a back-end server associated with the communication terminal. Following the executing, the method may include in response to a receipt of an API response, displaying on a second GUI, a plurality of additional selectable option buttons.

Following the pairing, the method may include creating a smart contact virtual overlay over the GUI. The smart contact virtual overlay may extend an area of the GUI that is within a visual field of interest of the user. The method may include tracking the focus of the user's eye only when the user's eye is focused within the parameters of the smart contact virtual overlay.

A system for communicating with a communication terminal via smart contact lenses interactions is provided. The system may include a smart contact lens device. The smart contact lens device may be situated on an eye of a user. The smart contact lens device may include a plurality of hardware components and a plurality of software components.

The communication terminal may be associated with an entity network. The communication terminal may include a display screen and a GUI on the display screen. The GUI may be configured to display selectable option buttons.

When the smart contact lens device is within a pre-determined proximity to the communication channel, the smart contact lens device may be configured to pair with the communication terminal. The pairing may confirm the user of the smart contact lens as an authenticated user of the communication terminal.

The pairing may include identifying, by the communication terminal, a device identification associated with the smart contact lens. In response to the identifying, the pairing may include performing, by the communication terminal, an iris recognition scan on an iris of the user to determine iris properties. The pairing may also include confirming the device identification and the iris properties correspond to device identification and iris properties stored in a user-profile associated with the user at the communication terminal.

In response to the pairing, the smart contact lens may be enabled to initiate a communication with the communication terminal.

The communication terminal may be configured to display on the GUI, a plurality of selectable option buttons.

The smart contact lens device may be configured to track a focus of the user's eyes on the GUI.

When the focus of the user's eye is determined to be focused on the GUI, the smart contact lens device may be configured to create a virtual overlay over the GUI. The virtual overlay may extend over the area of the GUI that is within a visual field of interest of the user.

The smart contact lens device may limit the tracking of the focus of the user's eye to be within the virtual overlay.

When a first deliberate eye blink gesture is identified while the user's eye is focusing on the GUI, the smart contact lens device may be configured to determine a point of focus of the user's eye.

It should be appreciated that when the point of focus is outside the virtual overlay, the smart contact lens device may pause the tracking of the focus of the user's eye. When the focus is detected to return to the virtual overlay area, the smart contact lens device may be triggered to retrack the point of focus.

Following the determination of the point of focus, the smart contact lens device may be configured to identify a selectable option button that is located within a pre-determined range of the point of focus. The pre-determined range of focus may define a field of focus surrounding the point of focus. The selectable option button may be the selected option button.

The smart contact lens device is also configured to determine a transaction type corresponding to the selected option button. In response to the determination of the transaction type, the smart contact lens device may be configured to transmit an instruction to the communication terminal. The instruction may include a request to initiate a transaction corresponding to the transaction type.

In some embodiments, the system may be configured to determine the transaction type using image data processing. The smart contact lens device may be configured to capture an image of the field of focus. The smart contact lens device may be further configured to compare the image to a list of pre-stored images and corresponding transaction types stored in a database on the smart contact lens. Based on the comparing, the smart contact lens may be configured to identify the transaction type corresponding to the image.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Smart contact lens 102, smart contact lens 202 and smart contact lens 302, may have one or more features in common with the smart contact lens described herein. Additionally, features of smart contact lens described in connection with FIGS. 1-4 may be included in the smart contact lens described herein.

FIG. 1 shows an illustrative system 100 in accordance with principles of the invention. A smart contact lens user is shown wearing smart contact lens 102. Smart contact lens 102 may be in communication with an ATM 104. A mobile device 106 may be within the possession of the user.

The ATM 104 may include a GUI 108. GUI 108 may display a plurality of selectable option buttons 120, 122, 124, 126, 128, 130 and 132.

Smart contact lens 102 may be configured to execute a smart contact lens pairing module 110, a user identification and transaction processing module 112, a blink tracking module 114, an ATM screen navigation module 116 and a smart contact lens transaction orchestration module 118. Each of these modules may utilize artificial intelligence 120 and machine learning 122 when executed.

Each of 110, 112, 114, 116 and 118 may be executed on smart contact lens 102. In some embodiments, each of 110, 112, 114, 116 and 118 may be executed on a remote server.

The smart contact lens may include one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

It should be appreciated that edge computing may enable the smart contact lens to perform all the functions and methods disclosed herewith. When run on the smart contact lens, each hardware may be a micro version. Processors, receivers, transmitters, sensors and cameras and any other suitable hardware may be micro.

The smart contact lens and the remote server may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include a speaker for providing audio output and/or a video display for providing textual, audiovisual and/or graphical output.

Software applications executed by the smart contact lens and the remote server may be stored within the non-transitory memory and/or other storage medium. Software applications may provide instructions to the processor that enable the apparatus to perform various functions. The instructions may include any of the smart contact lens methods and processes described herein. For example, the non-transitory memory may store software applications such as the blink tracking module 114 and the ATM screen navigation module 116. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The smart contact lens and the remote server may be part of two or more networks. The smart contact lens and the remote server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the smart contact lens and the remote server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards.

The smart contact lens 102 may initiate a pairing with the ATM 104. The pairing may be enabled via a wireless communication. The wireless communication may be enabled via NFC, Lifi, Bluetooth, Wifi or any other suitable mode. The ATM may authenticate the user of the smart contact lens by authenticating both the smart contact lens and the mobile device. In some embodiments, the ATM may authenticate the user only via the smart contact lens.

It should be appreciated that a contactless communication with an ATM may enable or at least simplify communication. For example, a user with a disability may find it difficult to physically reach and/or touch an ATM or any communication terminal to perform transactions. The contactless communication may make it easier for a user with a disability to interact with the ATM or any other contactless communication terminal.

Figure 2:
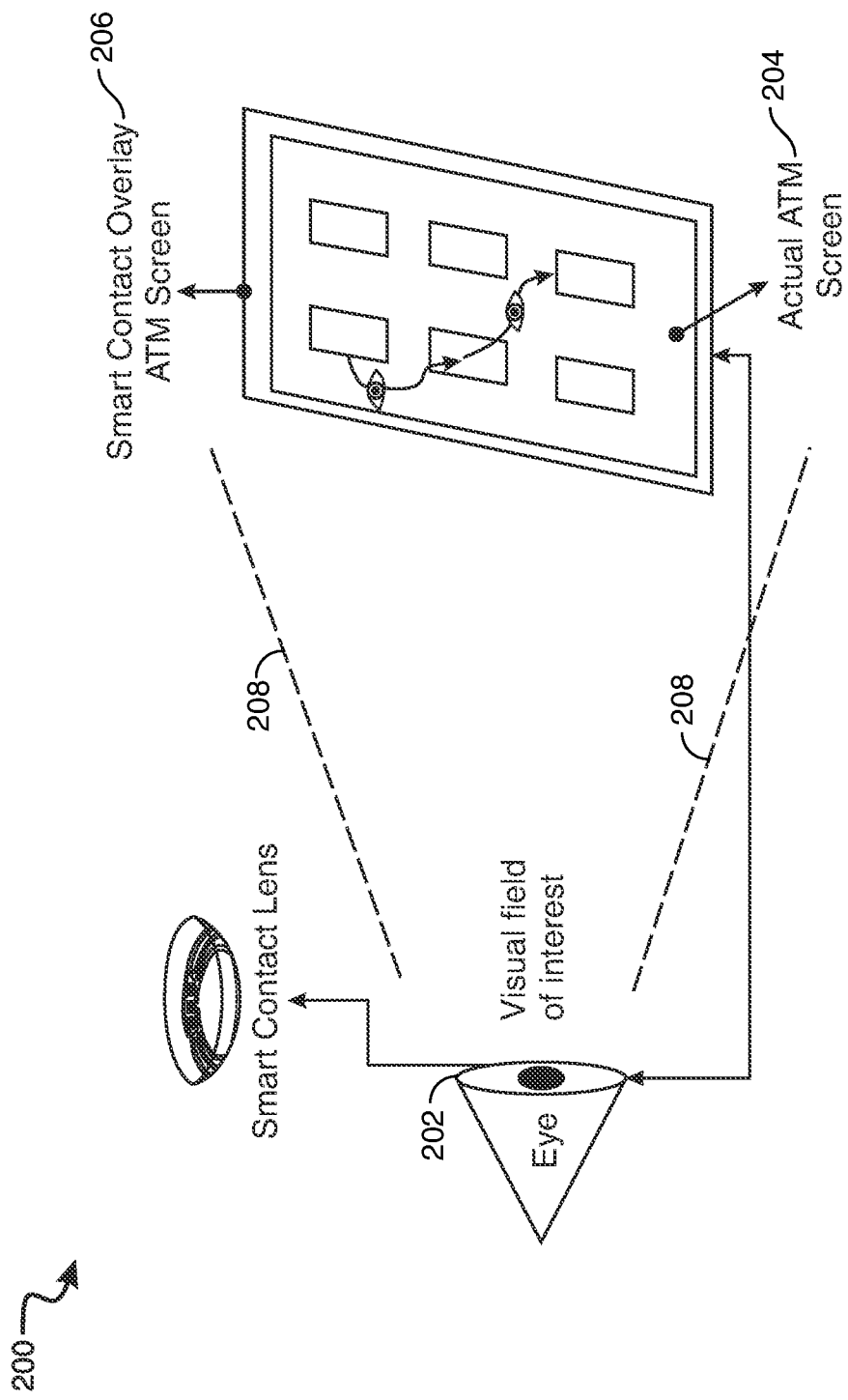
FIG. 2 shows an exemplary diagram in accordance with principles of the disclosure.

FIG. 2 shows an illustrative diagram 200 of a smart contact lens 202 focusing on an ATM screen 204.

The smart contact lens 202 may detect the user's focus of the eye on the ATM screen 204. Smart contact lens 202 may create a virtual overlay 206 over the ATM screen 204. The virtual overlay 206 may include the area of the ATM screen and the area within the visual field of interest 208 of the user's eyes.

The system may be trained to identify the area of the ATM GUI and to lock out the surrounding areas from being triggered to capture eye blink gestures.

When the user's eye(s) is focusing within the virtual overlay 206, the blink tracking module may track the user's eye focus. The blink tracking module may detect the user's eye blink gestures. When a deliberate eye blink gesture is identified, the smart contact lens may determine the selectable option button that may be within range of the point of focus at the time the deliberate eye blink gesture is performed.

Figure 3:
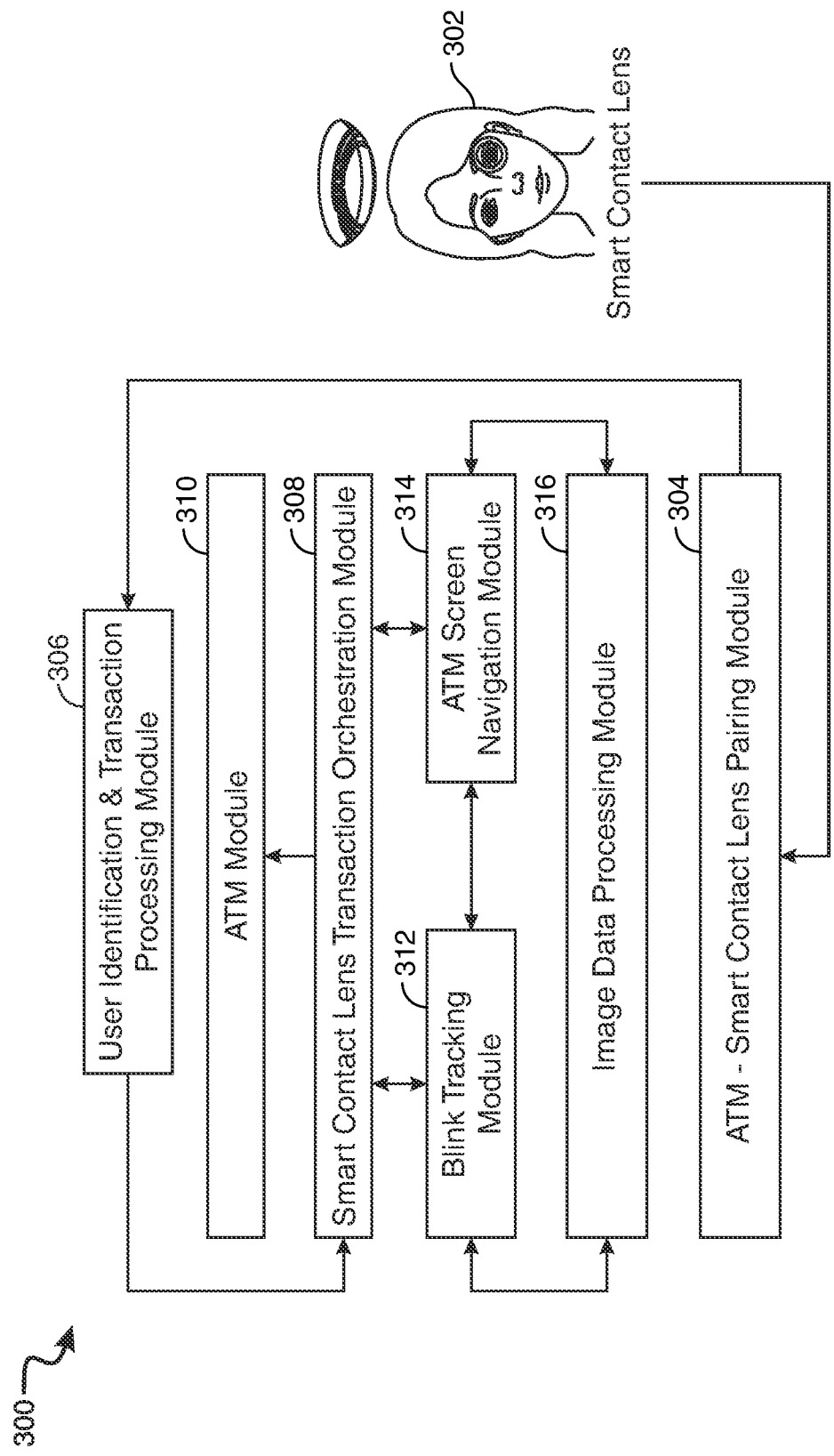
FIG. 3 shows an illustrative diagram in accordance with principles of the disclosure.

FIG. 3 shows an illustrative diagram 300 in accordance with principles of the invention. Smart contact lens 302 may initiate a pairing with the ATM by executing the smart contact lens pairing module 304. The smart contact lens may be paired with the ATM using a token and/or password.

Following the pairing of the smart contact lens to the ATM, the user identification and transaction processing module 306 may be executed. The user identification and transaction processing module 306 may verify and validate the user as an authenticated user of the entity associated with the ATM. Following the pairing of the ATM and the smart contact lens, module 306 may verify and validate user information using biometric properties. In some embodiments the validation may be performed using a token.

Because the smart contact lens is situated on the eye of the user, biometric properties can be extracted directly from the eye by the smart contact lens. Biometric properties of the eye may include properties of the user's tear drops and other components included in an eye.

Following the verifying of the user information, the verification data may be transmitted to the smart contact lens transaction orchestration module 308 to initiate a transaction.

The smart contact lens transaction orchestration module 308 may be configured to orchestrate user interaction on the smart contact lens to enable ATM transactions. The interactions may include the monitoring of sequence of events that the user may be performing in order to select a selectable option button on the GUI. The selecting of the option buttons may be identified by the eye blink gesture.

Another interaction may include tracking the eye at the ATM GUI and identifying the visual field of interest at the ATM. Additionally, module 308 may be enabled to capture cognitive information and processing throughout the transaction.

The ATM screen navigation module 314 may provide feeds received from eye tracking algorithms that track eye movement to the smart contact lens transaction orchestration module 308 which enables the orchestration of the transactions. The ATM screen navigation module 314 may monitor what the user's eye is focusing on at the ATM GUI.

While monitoring the focus of the user's eye, the blink tracking module 312 may be configured to track blink gestures. When deliberate eye blink gestures are identified, instruction may be transmitted to the ATM to perform one or more transactions. The ATM may be configured to receive the instruction and interpret the instruction.

The ATM may be in communication with a back-end server of the ATM for performing the transactions.

Figure 4:
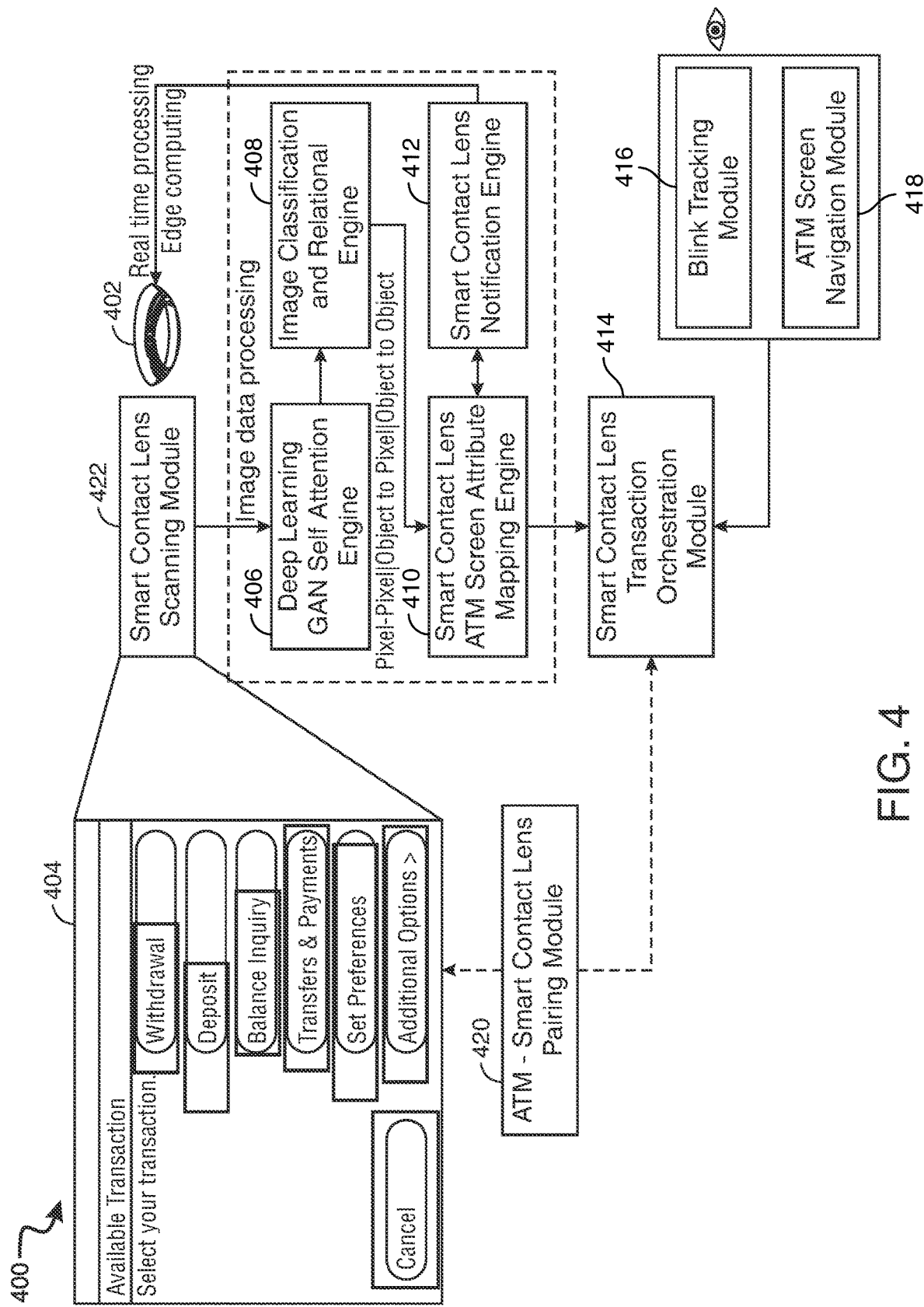
FIG. 4 shows illustrative systems and methods in accordance with principles of the disclosure.

FIG. 4 shows an illustrative diagram 400 in accordance with principles of the disclosure. Smart contact lens 402 may include a smart contact lens scanning module 422 which upon execution may identify the selectable option button that the user may be focusing on at the ATM GUI 404.

The smart contact lens scanning module 422 and each of the modules 420, 414, 416 and 418 may be stored at the smart contact lens 402

ATM GUI 404 may display selectable option buttons. Smart contact lens 402 may execute the smart contact lens pairing module 420 to initiate a pairing of the smart contact lens 402 to the ATM 404.

Following the pairing, the smart contact lens transaction orchestration module 414 may orchestrate the transaction based on data identified by the blink tracking module 416 and the ATM screen navigation module 418.

The blink tracking module 416 and the ATM screen navigation module 418 may be executed to determine the focus of the user's eye and identify deliberate eye blink gestures that may indicate a selection of a selectable option button.

The selectable option buttons displayed on GUI 404, in this exemplary diagram, may include a 'withdrawal button', a 'deposit' button, a 'balance inquiry' button, a 'transfers and payments' button, a 'set preferences' button, an 'additional options' button and a 'cancel' button.

When the user performs a deliberate eye blink gesture while focusing on one of the selectable options buttons, the smart contact lens scanning module 422 may use one or more image data processing algorithms to classify the button and the type of transaction associated with the button.

The image data processing algorithms may include a deep learning generative adversarial network ("GAN") engine 406. Image data processing may also include image classification and relational engine 408. Image data processing may also include smart contact lens ATM screen attribute mapping engine 410 which may also include a smart contact lens notification engine 412.

The system may use deep learning and tiny machine learning ("ML") to classify the buttons. Deep learning and Tiny ML may refer to machine learning processes that can be performed on the microprocessor without surpassing the microprocessor's processing capacities. Exemplary algorithms for deep learning and ML are cognitive neural networks ("CNNs") and GAN. The CNNs may ensure stable eye tracking. The GAN may be used to classify fields at the GUI and capture a contextual understanding. The GAN may determine the location of the image on the GUI and classify the image and the associated transaction, based on the location and the additional objects surrounding the location.

In some embodiments the classification may be determined based on the actual position of the image within the GUI using object to object algorithms and object to pixel algorithms. Based on the resolution and the location within the GUI, the smart contact lens may be enabled to identify the selected button.

In some embodiments the classification may be performed using pixel to pixel algorithms. This may enable a more accurate classification.

In some embodiments a smart contact lens device is provided. The smart contact lens device may be in communication with an ATM using a wireless communication. The smart contact lens device may be located on an eye of a user.

The wireless communication may be enabled using Lifi or other wireless communications.

The smart contact lens device may include a micro camera, a memory, one or more sensors and a microprocessor. The smart contact lens device may include additional hardware and software components described herein.

The microprocessor may be operable to, using the micro camera and the one or more sensors, detect a point of focus of an eye of the user, identify a selectable option button that is located within a pre-determined range of the point of focus, determine a transaction type corresponding to the selectable option button, and transmit an instruction to the ATM to execute a transaction based on the determined transaction type.

When the user is within a pre-determined range to the ATM, the microprocessor may be operable to execute a smart contact lens pairing application. The smart contact lens pairing application may, upon execution, confirm the user as an authenticated user of the ATM.

The microprocessor may be operable to execute a blink tracking application configured to detect a focus of the user's eye when the user's eye is focusing on a GUI of the ATM. The blink tracking application may also be configured to identify a deliberate eye blink gesture performed when the user's eye is focusing on the GUI and determine the point of focus at a time of the performing of the deliberate eye blink gesture.

The microprocessor may also be operable to execute an image data processing application. The image data processing application may be operable to classify a selected selectable option button based on the point of focus.

The microprocessor may also be operable to execute a smart contact lens transaction orchestration application configured to determine a transaction associated with the selected selectable option button and transmit an instruction to the ATM to process the determined transaction.

Thus, methods and apparatus for performing a touchless transaction at a communication terminal is provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for performing a touchless transaction at a communication terminal, the executing leveraging a smart contact lens, the smart contact lens positioned on an eye of a user, the user being within a pre-determined proximity to the communication terminal, the pre-determined proximity enabling a wireless communication between the smart contact lens and the communication terminal, the method comprising:

pairing the smart contact lens to the communication terminal, the pairing confirming the user of the smart contact lens as an authenticated user of the communication terminal, the pairing comprising a multi-factor authentication of the user, the pairing enabled via the communication terminal, the pairing comprising:
receiving a token at the smart contact lens from the communication terminal;
displaying the token on a virtual screen on the smart contact lens;
inputting the token into a mobile application on a mobile device of the user, the mobile device within the pre-determined proximity to the communication terminal;
transmitting the token from the mobile application to the communication terminal; and
confirming, at the communication terminal, the smart contact lens, mobile device and token being associated with a user-profile of the user of the smart contact lens;

in response to the pairing, enabling a communication between the smart contact lens and the communication terminal by displaying on a graphical user interface ("GUI") of the communication terminal, a plurality of selectable option buttons;
triggering a tracking of a focus of the user's eye on the GUI;
when a first deliberate eye blink gesture is identified while the user's eye is focusing on the GUI, determining a point of focus of the user's eye;
identifying a selectable option button that is located within a pre-determined range of the point of focus, the pre-determined range, of the point of focus defining a field of focus surrounding the point of focus, the selectable option button being the selected option button;
determining a transaction type corresponding to the selected option button; and
transmitting an instruction to the communication terminal, the instruction comprising a request to initiate a transaction corresponding to the transaction type.

2. The method of claim 1 wherein the smart contact lens is a near-field communication ("NFC") powered device and the communication terminal is an NFC powered terminal.

3. The method of claim 1 wherein the pairing comprises:
identifying, by the communication terminal, a device identification associated with the smart contact lens;
performing, by the communication terminal, an iris recognition scan on an iris of the user to determine iris properties; and
confirming the device identification and the iris properties correspond to device identification and iris properties stored in a user profile associated with the user at the communication terminal.

4. The method of claim 3 wherein when one of the device identification or the iris properties do not correspond to the stored device identification and the stored iris properties, the method further comprises disabling the performing of the transaction on the communication terminal, the disabling comprising:
displaying an error message on the GUI; and
disabling the selectable option buttons on the display from being selectable.

5. The method of claim 1 wherein the smart contact lens is a light-fidelity ("LiFi") powered device and the communication terminal is a LiFi powered terminal.

6. The method of claim 1 wherein the determining the transaction type comprises:
capturing an image of the field of focus;
comparing the image to a list of pre-stored images and corresponding transaction types stored in a database on the smart contact lens; and
based on the comparing, identifying the transaction type corresponding to the image.

7. The method of claim 1 further comprising confirming an accuracy of the selected option button by:
highlighting on the GUI the selected option button;
in response to the highlighting, identifying a second deliberate eye blink gesture at the point of focus; and
in response to the identifying of the second deliberate eye blink gesture, confirming the accuracy of the selected option button.

8. The method of claim 1 wherein the GUI is a first GUI and the method further comprises, in response to a receipt of the communication:
executing an application programming interface ("API") call with a back-end server, at the communication terminal, for in the transaction associated with the transaction type; and
displaying on a second GUI, in response to at API response, a plurality of additional selectable option buttons.

9. The method of claim 1 wherein, in response to the pairing, the method further comprises:
creating a smart contact virtual overlay over the GUI, the smart contact virtual overlay extending an area of the GUI within a visual field of interest of the user, and
tracking the focus of the user's eye when the user's eye is focused within the smart contact virtual overlay.

10. The method of claim 1 wherein the communication terminal is an automated teller machine ("ATM").

11. A system using smart contact lenses interactions for communicating with a communication terminal, the system comprising:
a smart contact lens device, the smart contact lens device situated on an eye of a user, the smart contact lens device comprising a plurality of hardware components and a plurality of software components; and
the communication terminal, wherein the communication terminal is associated with an entity network, the communication terminal comprising a display screen and a graphical user interface ("GUI") on the display screen, the GUI configured to display selectable option buttons;
wherein when the smart contact lens device is within a pre-determined proximity to the communication terminal:
the smart contact lens device is configured to:
pair with the communication terminal, the pairing confirming the user of the smart contact lens device as an authenticated user of the communication terminal; and
in response to the pairing, the smart contact lens device is enabled to initiate a communication with the communication terminal;
the communication terminal is configured to display on the GUI a plurality of selectable option button; and
the smart contact lens device is configured to:
track a focus of the user's eyes oil the GUI;
determine the focus of the user's eye within the GUI; and
in response to the determining:
create a virtual overlay over the GUI;
limit the tracking of the focus of the user's eye to within the virtual overlay;
when a deliberate eye blink gesture is identified while the user's eye is focusing within the virtual overlay, the smart contact lens device is configured to:
determine a point of focus of the user's eye;
identify a selectable option button that is located within a pre-determined range of the point of focus, the pry determined range of the point of focus defining a field of focus surrounding the point of focus, the selectable option button being the selected option button;
determine a transaction type corresponding to the selected option button; and
transmit an instruction to the communication terminal, the instruction comprising a request to initiate, a transaction corresponding to the transaction type; and
when the user's eye is focused outside the virtual overlay, the smart contact lens device is configured to pause the tracking of the focus of the user's eye.

12. The system of claim 11 wherein the determining of the transaction type comprises using an image data processing algorithm, the image data processing algorithm, when executed, comprises:
   capturing an image of the field of focus;
   comparing the image to a list of pre-stored images and corresponding transaction types stored in a database on the smart contact lens; and
   based on the comparing, identifying the transaction type corresponding to the image.

13. The system of claim 11 wherein the pre-determined proximity is a proximity enabling a wireless communication between the smart contact lens device and the communication terminal.

14. The system of claim 11 wherein the pairing of the smart contact lens device with the communication terminal comprises:
   identifying, by the communication terminal, a device identification associated with the smart contact lens;
   performing, by the communication terminal, an iris recognition scan on an iris of the user to determine iris properties; and
   confirming the device identification and the iris properties correspond to device identification and iris properties stored in a user-profile associated with the user at the communication terminal.

15. A smart contact lens device, the smart contact lens device in communication with an automated teller machine ("ATM") using a wireless communication, the smart contact lens device located on an eye of a user, the smart contact lens device comprising:
   a micro camera;
   a memory;
   one or more sensors; and
   microprocessor operable to, using the micro camera and the one or more sensors, detect a point of focus of an eye of the user, identify a selectable option button that is located within a pre-determined range of the point of focus, determine a transaction type corresponding to the selectable option button, and transmit an instruction to the ATM to execute a transaction based on the determined transaction type;
   wherein, when the user is within a pre-determined range to the ATM, the microprocessor is operable to execute:
      a smart contact lens pairing module, the smart contact lens pairing application confirming the user as an authenticated user of the ATM, the pairing comprising a multi-factor authentication of the user, the pairing enabled via the communication terminal, the pairing comprising:
         receiving a token at the smart contact lens from the communication terminal;
         displaying the token on a virtual screen on the smart contact lens;
         inputting the token into a mobile application on a mobile device of the user, the mobile device within the pre-determined proximity to the communication terminal;
         transmitting the token from the mobile application to the communication terminal; and
         confirming, at the communication terminal, the smart contact lens, mobile device and token being associated with a user-profile of the user the smart contact lens;
      a blink tracking application configured to:
         detect a focus of the user's eye when the user's eye is focusing on a graphical user interface ("GUI") of the ATM;
         identify a deliberate eye blink gesture performed when the user's eye is focusing on the GUI; and
         determine the point of focus at a time of the performing of the deliberate eye blink gesture;
      an image data processing application operable to classify a selected selectable option button based on the point of focus; and
      a smart contact lens transaction orchestration application operable to:
         determine a transaction associated with the selected selectable option button; and
         transmit an instruction to the ATM to process the determined transaction.

16. The smart contact lens device of claim 15 wherein the wireless communication is enabled using light fidelity ("LiFi") and the smart contact lens device and the ATM comprise a light emitting diode ("LED") to enable the wireless communication using Lifi.

* * * * *